United States Patent
Krawczyk

[11] Patent Number: 5,726,743
[45] Date of Patent: Mar. 10, 1998

[54] LASER OBSERVATION SPACE INSTRUMENT AND A SPACE VEHICLE INCLUDING IT

[75] Inventor: Rodolphe Krawczyk, Antibes, France

[73] Assignee: Societe Nationale Industrielle et Aerospatiale, France

[21] Appl. No.: 438,100

[22] Filed: May 8, 1995

[30] Foreign Application Priority Data

May 27, 1994 [FR] France ................... 94 06478

[51] Int. Cl.$^6$ ........................... G01P 3/36
[52] U.S. Cl. ........................... 356/28.5; 356/342
[58] Field of Search ............... 356/28.5, 5.09, 356/342

[56] References Cited

U.S. PATENT DOCUMENTS

| | | |
|---|---|---|
| 3,984,685 | 10/1976 | Fletcher et al. |
| 4,470,696 | 9/1984 | Ballard ............... 356/28.5 |
| 4,483,614 | 11/1984 | Rogers ............... 356/28.5 |
| 5,255,065 | 10/1993 | Schwemmer . |
| 5,367,371 | 11/1994 | Krawczyk ............ 356/28.5 |

FOREIGN PATENT DOCUMENTS

| | | | |
|---|---|---|---|
| 3937851 | 5/1990 | Germany ............. | 356/28.5 |
| 54-97469 | 1/1979 | Japan .................. | 356/28.5 |
| 2221591 | 8/1988 | United Kingdom ... | 356/28.5 |

OTHER PUBLICATIONS

R.L. Schuiesow et al, Applied Optics, May 1977, vol. 16, No. 5, pp. 1145.

*Primary Examiner*—Stephen C. Buczinski
*Attorney, Agent, or Firm*—Vanophem Meehan & Vanophem, P.C.

[57] ABSTRACT

A laser observation space instrument for the quantitative characterization by DOPPLER effect of movements within a fluid mass carried by a planet having a reference axis locally parallel to its trajectory and including a laser generator, a frequency measuring unit, first and second sighting elements aligned on the reference axis and having first and second lines of sight of non-null inclinations with respect to the reference axis and intended for emitting and receiving laser beams, a single telescope with its axis merged with the reference axis in order to send beams emitted by the laser generator to the sighting elements and to apply laser beams received by these sighting elements to the measuring unit, and rotating means for rotating the sighting elements with respect to the panel about the reference axis. The first sighting element, disposed between the telescope and the second sighting element, is adapted to transmit, to the second sighting element, along the reference axis, laser beams sent by the telescope, and vice versa.

12 Claims, 1 Drawing Sheet

5,726,743

LASER OBSERVATION SPACE INSTRUMENT AND A SPACE VEHICLE INCLUDING IT

BACKGROUND OF THE INVENTION

1. Field of the Invention

The present invention concerns a laser observation space vehicle, notably for measuring the speed of winds, and more specifically a simplified observation instrument adapted to form part thereof. 2. Description of the Prior Art The object of U.S. Pat. No. 5,367,371, entitled "Observation Space Vehicle having a Laser-Based Measurement System" issued Nov. 22, 1994, and owned by the common Assignee hereof, was to allow, from an orbiting platform, velocity measurements at points uniformly distributed in a fluid mass on the surface of a planet (typically wind measurements on the surface of the Earth) using DOPPLER LIDAR equipment, with or without coherent detection, whose lines of sight, in bands of this fluid mass, effect a scanning at least partially transverse to the instantaneous trajectory of the platform, without any need for variable tunability of the emission laser or local oscillator (in the case of coherent detection) or of the reception filter or filters (in the case of direct detection) and without any significant weight or size penalty compared with the solutions known-up until then.

This prior patent proposed a space vehicle for the quantitative characterization, by DOPPLER effect, of movements within a fluid mass carried by a planet such as the Earth. The space vehicle includes a platform, adapted to follow an orbit around the planet, and has a roll axis, intended to be parallel to the orbit, and a yaw axis, intended to be oriented toward the center of the planet. The space vehicle also includes an observation assembly, including a laser generator, a frequency measurement unit, and two telescopes, each telescope provided with a sighting element having a line of sight intended to be oriented toward the planet, adapted to send, from the laser generator, a beam emitted along the line of sight and to pick up a reflected beam on the axis and then to apply it to the frequency measurement unit. The two sighting elements are connected to the platform by rotating motors with axes parallel to the roll axis. In this patent, provision is made for the two lines of sight to have projections in opposite directions on the roll axis.

The rotating motors are advantageously oscillating, preferably in phase opposition, with an oscillating period preferably between 1 and 100 sec.

In a first embodiment, the sighting elements are lenses attached to telescopes, and the telescopes are connected to the platform by the rotating motors.

In a second embodiment, the sighting elements are mirrors, able to move with respect to the telescopes, which are fixed with respect to the platform.

The first and second lines of sight advantageously have, with respect to the roll axis, an inclination of between 20° and 80° and preferably between 40° and 50°.

The fact that the lines of sight are made to rotate, not about an axis directed toward the nadir (the "conventional" solution) but about the axis given by the velocity of the satellite on its orbit, has the great advantage of making the parasitic DOPPLER effect, introduced by the movement of the satellite with respect to the planet in question, constant and therefore easily compensatable. The purpose of the telescopes was to obtain measurements along different lines of sight, so as to obtain the components of the wind velocity (two components if only the horizontal wind is of interest, but three components for the "total" vector of the wind).

SUMMARY OF THE INVENTION

The primary object of the present invention is to reduce still further the weight and size of the observation system without impairing the performance thereof and the advantages that the aforesaid solution makes possible to achieve.

To this end, the invention proposes a solution with a single telescope, taking advantage of the existence of diffractive lenses, that is to say optical elements transmitting (or reflecting) incident beams in one or two given directions, which may as desired be different from the direction of the incident beams. One example of diffractive lenses is given in "Holographic Optical Elements as Conically Scanned Lidar Telescopes", by G. K. Schwemmer and T. D. Wilkerson, which appeared in Technical Digest on Optical Remote Sensing of the Atmosphere, 1991 (Optical Society of America, Washington, D.C., 1991) Vol. 18, pp. 310–312.

More precisely, the invention proposes a laser observation space instrument, for the quantitative characterization by DOPPLER effect of movements within a fluid mass carried by a planet, intended to be moved by a carrier vehicle along a trajectory above the fluid mass, having a reference axis intended to be locally parallel to this trajectory and including a panel for fixing the instrument to the carrier vehicle. The instrument includes a laser generator, a frequency measuring unit, and first and second sighting elements aligned on the reference axis having first and second lines of sight of non-null inclinations with respect to the reference axis which are intended to be oriented toward the planet for the emission and reception of laser beams, the reference axis having projections of preferably opposite directions. The instrument further includes a telescope device, whose axis is merged with the reference axis in order to send beams emitted by the laser generator to the sighting elements and to apply laser beams received by the sighting elements to the measuring unit, and means to rotate the sighting elements with respect to the panel about the reference axis. The telescope device of the instrument includes a single telescope, and the first sighting element is disposed between the telescope and the second sighting element and is adapted to transmit, to the second sighting element, along the reference axis, at least a part of the laser beams sent by the telescope at a predetermined frequency, and to transmit, to the telescope, along the reference axis, laser beams received by the second sighting element.

According to the preferred features of the invention, which may be optionally combined:

- the first sighting element is a diffractive transmission optical element, coaxial with the telescope and of a diameter which is at least approximately equal to the optical diameter of the telescope and having two transmission axes respectively merged with the reference axis and the first line of sight, and the second sighting element is a reflection optical element;
- the second sighting element is a mirror inclined with respect to the reference axis;
- the second sighting element is a diffractive reflection optical element, coaxial with the telescope, having a diameter which is at least approximately equal to the optical diameter of the telescope and having a reflection axis merged with the second line of sight;
- the laser generator has a single emission frequency at which the diffractive transmission optical element transmits a laser beam coming from the laser generator partly along the reference axis and partly along the first line of sight, the first and second lines of sight having different inclinations with respect to the reference axis;

the laser generator has a first emission frequency, at which the diffractive transmission optical element transmits the whole of a laser beam coming from the laser generator along the reference axis, and a second emission frequency, at which the diffractive transmission optical element transmits the whole of a laser beam coming from the laser generator along the first line of sight;

the first and second lines of sight have, with respect to the reference axis, inclinations which are equal but of opposite signs;

the first and second lines of sight have, with respect to the reference axis, inclinations of between 20° and 80°; and the inclinations are between 40° and 50°.

The invention also concerns a simplified observation instrument.

As a matter of fact, it has been explained that the measurement of wind velocities with a space-borne lidar instrument most often dictates a scanning mechanism so as to get a sufficiently covered area allowing to derive what scientists call a "wind field". Each elementary measurement (corresponding to one laser shot) is basically performed along one line of sight (LOS) which is the line joining the emitting lidar instrument and the target area (named cell) hit by the laser beam and from which the return signal comes back to the instrument. The obtention of several lines of sight to get the required coverage is ensured either by scanning the emitting beam with a suitable device or by emitting along different predetermined fixed lines of sight.

So far, scientists have favored measurements along two different lines of sight for each cell, making it possible to retrieve the horizontal component of the wind velocities in this cell. However, the recent emergence of sophisticated wind assimilation models seems to render acceptable the obtention of a satisfying level of wind field knowledge with measurements along only one line of sight in each cell.

Thus, the invention further proposes a laser observation space instrument for the quantitative characterization by DOPPLER effect of movements within a fluid mass carried by a planet, intended to be moved by a carrier vehicle along a trajectory above the fluid mass, having a reference axis intended to be locally parallel to this trajectory and including a panel for fixing the instrument to the carrier vehicle. The instrument includes a laser generator, a frequency measuring unit, sighting means aligned on the reference axis and having at least first and second lines of sight of non-null inclinations with respect to the reference axis which are intended to be oriented towards the planet for the emission and reception of laser beams. The instrument includes a telescope device whose axis is merged with the reference axis in order to send beams emitted by the laser generator to the sighting means and to apply laser beams received by same to the measuring unit. The telescope device of the instrument includes a single telescope, and the sighting means includes a diffractive optical element which is adapted to split the laser beams sent by the telescope at a predetermined frequency into at least two beams having different directions and to send to the telescope, along the reference axis, laser beams received along the different directions.

It should be noted that such general definition of the invention includes the more detailed definition given above.

As a preferred feature, the diffractive optical element is of the reflecting type with several different reflecting directions with respect to the reference line along which the telescope transmits and receives laser beams.

The invention also concerns a space vehicle provided with such an observation instrument.

Objects, characteristics, and advantages of the invention will emerge from the following description, given by way of non-limitative example, with regard to the accompanying drawings.

DETAILED DESCRIPTION OF THE PREFERRED EMBODIMENT

Figure 1A:
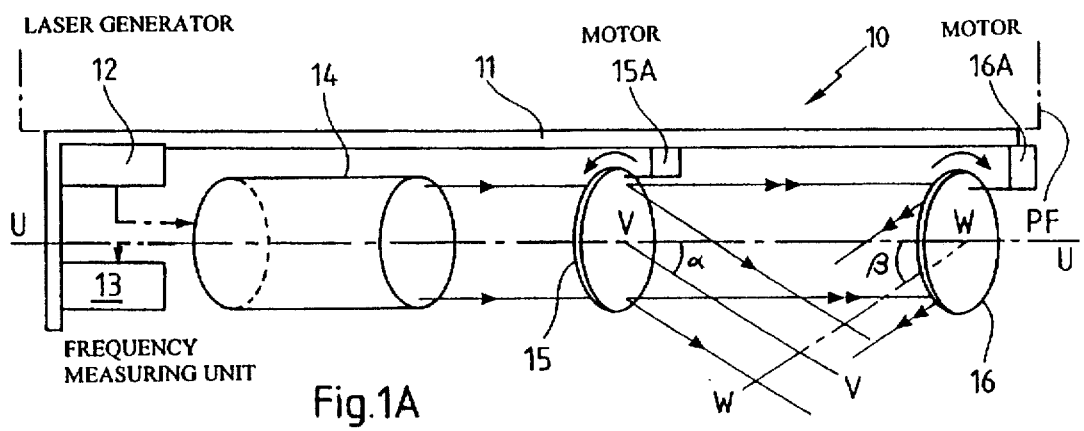
FIG. 1A is a diagrammatic view in perspective of an observation instrument according to the invention, depicting beams emitted along two lines of sight.
Figure 1B:
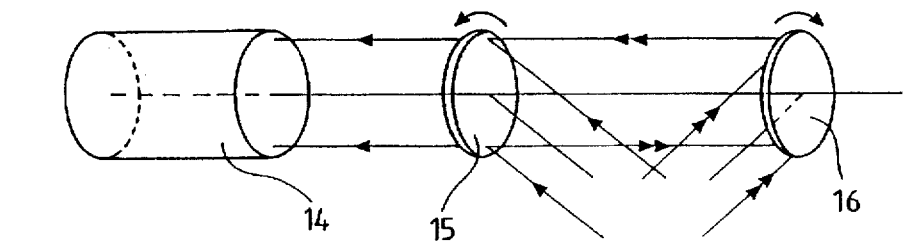
FIG. 1B is a similar diagrammatic view, depicting beams picked up on the two lines of sight.

FIGS. 1A and 1B depict diagrammatically a laser observation space instrument, indicated overall by the reference numeral 10, designed for the quantitative characterization, by DOPPLER effect, of movements within a fluid mass carried by a planet.

The instrument 10 is designed to be moved by a carrier vehicle along a trajectory T (see FIG. 4) above the fluid mass. The carrier vehicle is in practice a platform PF depicted in dot and dash lines in FIG. 1A, and the whole constitutes a space vehicle or satellite S represented by a single point in FIG. 4.

Figure 4:
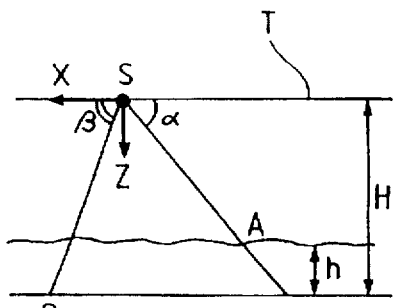
FIG. 4 is a diagrammatic view of a space vehicle fitted with the instrument of FIG. 1, on an orbit of altitude H, travelling over an atmospheric layer of height h.

The trajectory T is represented by a straight line in FIG. 4, but this is only for the purpose of simplification since this trajectory is in principle an orbit. H designates its altitude, and h designates the mean thickness or height of the fluid mass to be characterized.

The platform has a roll axis X intended to be locally parallel to the trajectory and a yaw axis Z intended to be oriented toward the center of the planet.

The laser observation space instrument 10 has a reference axis U-U intended, when the instrument is fixed to the platform, to be parallel to the roll axis.

The instrument has a panel, shown diagrammatically at 11, for fixing it to the platform PF by any suitable known means (not shown). Mounted to the panel 11 are:

a laser generator depicted diagrammatically at 12, intended to emit laser beams;

a frequency measuring unit depicted diagrammatically at 13 and intended to receive laser beams picked up by the instrument 10;

a single telescope 14 with its axis merged with the reference axis;

first and second sighting elements 15 and 16, aligned on and coaxial with the reference axis U-U, having first and second lines of sight V-V and W-W intended to be oriented toward the planet for emitting and receiving laser beams; and first and second rotating motors 15A and 16A for rotating the sighting elements about the reference axis, preferably pivoting, and advantageously in phase opposition.

The telescope 14 is adapted to send beams, emitted by the laser generator 12, to the sighting elements and to apply laser beams received by the sighting elements to the measuring unit 13.

The lines of sight V-V and W-W preferably have, on the reference axis, projections of opposite directions. They have inclinations vis-a-vis the reference axis typically between 20° and 70°, or even 80°. In a variant (not shown), the lines of sight have projections in the same directions on the line of sight with different inclinations.

A first sighting element in this case means the one which is disposed between the telescope and the other sighting element.

The first sighting element 15 is adapted to transmit, along the reference axis, a part of the rays which it receives from the laser generator through the telescope. Two cases are possible:

1) either the laser generator emits beams at a single laser frequency λo, in which case the first sighting element 15 divides these beams into two sub-beams of energies which are advantageously substantially equal, one of which propagates toward the second sighting element 16 along the reference axis, and the other propagates along the first line of sight; or 2) the laser generator emits beams at two distinct frequencies λ1 and λ2, in which case the first sighting element may divide the beams as previously or, as a preferred variant (see FIG. 3), cause these beams to propagate, according to their frequency, either along the reference axis or along the first line of sight V-V.

In a highly simplified version, corresponding to a division of the beams, a semi-transparent plate can be chosen. This solution, however, notably has the drawback of also applying a division into two of the beams picked up by the second sighting element and sent toward the telescope, so that the telescope receives only a part of the beams picked up. Such a solution, on the other hand, enables the first line of sight to be in the direction of X.

This is why, in a highly preferred manner, the first sighting element is a diffractive transmission optical element coaxial with the telescope and of diameter approximately equal to the optical diameter of the telescope (or even greater than this diameter, but this results in an additional weight). The first sighting element 15 has two transmission axes merged respectively with the reference axis and the first line of sight. This solution has the advantage that in reception mode (see FIG. 1B) the beams received both along the first line of sight and along the second line of sight and reflected by the second sighting element are transmitted to the telescope in their entirety. The fact that the lines of sight may intersect does not, on the other hand, pose any problem.

The second sighting element 16 is, in FIGS. 1A and 1B, also a diffractive optical element affording, however, unlike the first sighting element 15, a reflection direction (merged with the second sighting element).

Figure 2:
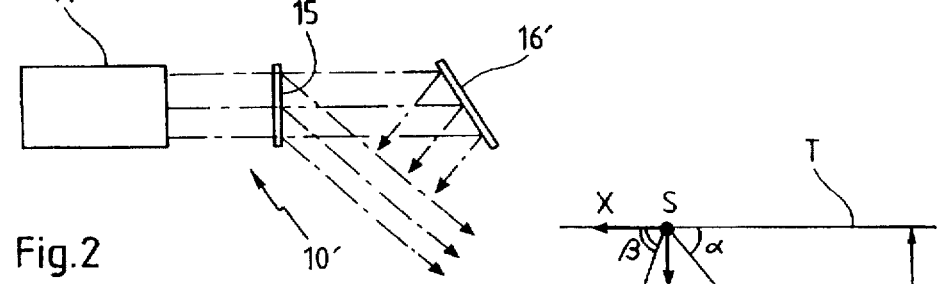
FIG. 2 is a diagrammatic side elevational view of another observation instrument according to the invention.

FIG. 2 depicts another instrument, marked 10', in which the second sighting element, which is marked 16' in order to distinguish it from FIGS. 1A and 1B, is a mirror inclined with respect to the reference axis.

The advantage of the second sighting element 16, when compared with the mirror 16', is that it has a smaller cross section since it, like the first sighting element 15, is perpendicular to U-U, and it, therefore, has a lower weight and, correlatively, a simpler dynamic balancing since the two diffractive optical elements can also have the same inertia, the lowest possible.

Figure 3:
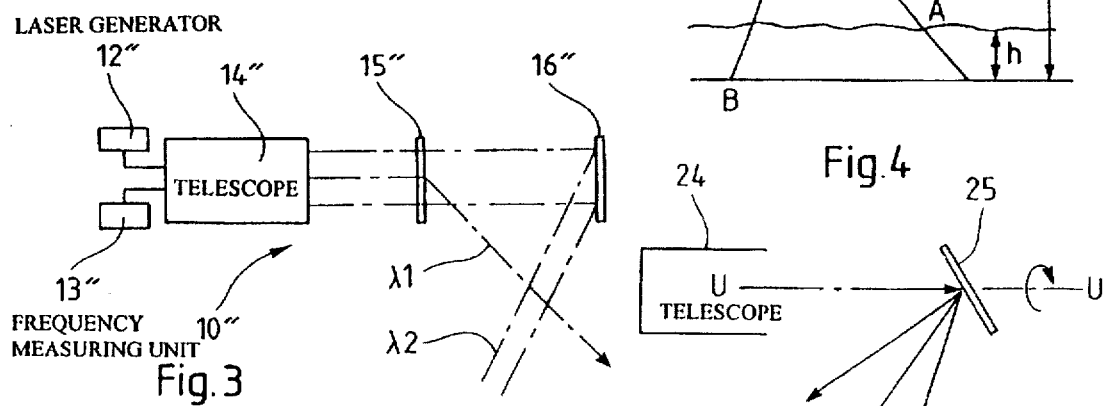
FIG. 3 is a diagrammatic side elevational view of yet another observation instrument according to the invention.

As was seen previously, FIG. 3 depicts another instrument 10" whose generator 12" has two operating frequencies, the first diffractive optical element 15" being designed so as to transmit, at the frequency of the pulse in question, either along U-U or along V-V. This has the following advantages:

at each laser firing, practically all the energy emitted on one of the lines of sight is recovered (as opposed to approximately only half in the examples of FIGS. 1A, 1B, and 2 with a single wavelength);

if the two wavelengths are well chosen, it is possible at the same time to use the instrument (it constitutes a lidar) as a DIAL (approximate acronym of DIfferential Absorption Lidar), enabling the concentration of certain constituents of the fluid mass to be measured, according to the wavelength used; and in addition, the respective inclinations α and β of the first and second lines of sight may be equal, which facilitates the detection and analysis of the returning signals.

It should, however, be noted that the first defraction optical element 15" must be calibrated in order to allow no "parasitic" beam to pass along V-V, or along U-U depending on the frequency of the laser firing in question. The first defraction element 15" must therefore be perfectly adjusted to these two frequencies and any drift, even slight, from these frequencies may severely degrade the performance of the instrument.

This constraint necessitates the use of a thick, and therefore heavy, diffractive lens, one which is more complex to produce.

It is advantageous to ensure that the two wavelengths are sufficiently close so that tuning the local oscillator of the instrument (not shown) according to one or other of the wavelengths is not necessary. In any event, a DIAL mission (see above) in practice requires these wavelengths to be close together.

On the other hand, when the first sighting element divides the emitted beams, it is recommended that the inclinations α and β be different so that the beams picked up along one or other of the lines of sight will be received at different times in order to facilitate detection, discrimination, and analysis thereof.

A person skilled in the art knows how to produce diffractive optical elements appropriate for his needs, for transmission, reflection, and acting as filters where appropriate (the case of FIG. 3). This will not be detailed here.

The inclination of α of the first sighting element is typically between 20° and 70° and preferably between 40° and 50°. The inclination β of the second sighting element is typically between 30° and 60° and preferably between 40° and 50°.

The difference between the inclinations α and β means that the DOPPLER effect due to the velocity of the satellite is not the same for the two lines of sight. Where the DOPPLER effect must be corrected before detection (that is to say the detection or measuring unit has not a sufficient passband, which may occur when the emission wavelength is below 5 μm), this may make it necessary to have a local oscillator which can be tuned to two wavelengths (for coherent detection). However, it appears possible to find values for α and β which are sufficiently different for the return signals at α and β to be received at different times, but sufficiently close for the DOPPLER effect difference to be acceptable at the level of the detector.

Another constraint is that the instrument includes a device (not shown) for compensating for the lag angle which, unlike the known solutions, must compensate for the lag angle of the radiation emitted/received a α and then that of the radiation omitted/received at β. This complication diminishes, however, if the reception of signals returning along one of the lines of sight is accepted, entirely before or after the signal returning along the other line of sight.

It is possible to show that the first constraint is satisfied if (taking α<β):

$$\frac{4 \, Vmax \cdot \cos\beta}{\lambda} + \frac{2VS}{\lambda} |\cos\alpha - \cos\beta| < B$$

where Vmax is the maximum velocity of the wind, VS is the velocity of the satellite, and B is the passband of the detector used.

The second constraint is satisfied by writing that the paths SA and SB comply with the following expression (taking α<β):

$$2 \cdot \frac{H-h}{\sin\alpha} > 2 \cdot \frac{H}{\sin\beta}$$

By way of example, α=45°, β=50°, λ=2 μm, B=2 GHz, H=400 km, h=7000 m/s, and Vmax=100 m/s.

It is possible to verify that the above-mentioned conditions are satisfied.

The first term of the first expression gives 580 MHz, which is much less than 2 GHz.

As for the second expression, this becomes 537 km>522 km, which is correct.

It goes without saying that the above description has been proposed only by way of a non-limiting example and that many variants may be proposed by a person skilled in the art without departing from the scope of the invention.

It may be noted that the above teaching is based upon the emission by the whole instrument of two simultaneous laser beams via two rotating optical elements featuring one diffractive transmitting element and one reflecting element (mirror or diffractive reflecting element). The first element splits the laser beam into two separate beams, one of which being directly deflected along one line of sight, the second one being oriented toward the second element which deflects it along the second line of sight. The coverage of the targeted area is ensured by scanning itself, performed by rotation of the optical elements. This rotation can of course be continuous or not, the non-continuous motion makes it possible to accumulate several shots to improve the signal-to-noise ratio of the returning signal.

It is clear that the absence of rotation nevertheless allows the collection of data along two lines of sight intercepting two longitudinal bands in the target mass. As already explained, it may be sufficient for some observation models to have data for a given cell along a single line of sight.

Figure 5:
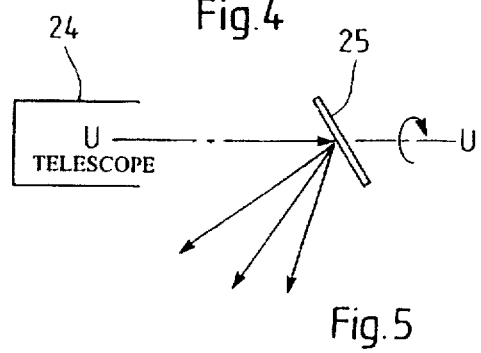
FIG. 5 is a diagrammatic side elevational view of a simplified observation instrument.

This invention can b& easily extended to measurements along one line of sight, for a relatively low number of cells (typically 2 to 6, but this number is not limitative), keeping only one diffractive optical element. In this case, it is more interesting to use a purely reflective element 25 to avoid the losses generated by a transmitting element. As embodied in FIG. 5, the principle is exactly the same as previously described, differing only in the fact that instead of splitting the laser beam aligned with a telescope 24 into two separate beams, this beam is indeed split into a certain number of beams (this number being lower than or equal to the number of cells) and deflected along all the corresponding lines of sight. Such a splitting makes it possible to drop the rotation of the optical element 25 if the number of split beams equals the number of cells (hence, typically 2 to 6, but this number is not limitative).

To prevent the simultaneous arrival of the return beams from different cells located at the same distance from the instrument (difficulties in signal processing would occur), it is recommended to split the laser beams at suitable angles that allow the return beams to reach the instrument at different times.

It is to be remembered that the return beam follows the same path (in a reverse way) as the emitted beam between the emitting/receiving telescope and the targeted area.

What is claimed is:

1. A laser observation space instrument for the quantitative characterization by DOPPLER effect of movements within a fluid mass carried by a planet, said laser observation space instrument capable of being moved by a carrier vehicle along a trajectory above said fluid mass, said laser observation space instrument comprising:

a reference axis capable of being oriented locally parallel to said trajectory;

a panel for mounting said laser observation space instrument to said carrier vehicle;

a laser generator mounted on said panel1 a frequency measuring unit mounted on said panel;

first and second sighting elements1 mounted on said panel and aligned on said reference axis, having first and second lines of sight of non-null inclinations with respect to said reference axis, said first and second lines of sight capable of being oriented toward said planet for the emission and reception of laser beams and having projections of opposite directions on said reference axis;

means for rotating said first and second sighting elements about said reference axis, said rotating means mounted on said panel; and a telescope device, with its having an axis collinear with said reference axis, for sending laser beams emitted by said laser generator to said first and second sighting elements and for applying laser beams received by said first and second sighting elements to said frequency measuring unit, said telescope device including a single telescope, said first sighting element of said first and second sighting elements disposed between said telescope device and said second sighting element of said first and second sighting elements, said first sighting element adapted to transmit, to said second sighting element, along said reference axis, at least a part of said laser beams sent by said telescope device at a predetermined frequency and to transmit, to said telescope device, along said reference axis, laser beams received by said second sighting element.

2. The laser observation space instrument according to claim 1, wherein said first sighting element comprises a diffractive transmission optical element, coaxial with said telescope device, having a diameter equal to the optical diameter of said telescope device and having two transmission axes, the first transmission axis of said two transmission axes positioned collinear with said reference axis and the second transmission axis of said two transmission axes positioned collinear with said first line of sight, and wherein said second sighting element comprises a reflection optical element.

3. The laser observation space instrument according to claim 2, wherein said second sighting element comprises a mirror inclined with respect to said reference axis.

4. The laser observation space instrument according to claim 2, wherein said second sighting element comprises a diffractive reflection optical element, coaxial with said telescope device, having a diameter equal to the optical diameter of said telescope device and has a reflection axis collinear with said second line of sight.

5. The laser observation space instrument according to claim 2, wherein said laser generator has a single emission frequency at which said diffractive transmission optical element transmits a laser beam emitted from said laser generator partly along said reference axis and partly along said first line of sight, said first and second lines of sight having different inclinations with respect to said reference axis.

6. The laser observation space instrument according to claim 2, wherein said laser generator has a first emission frequency at which said diffractive transmission optical element transmits the whole of a laser beam emitted from said laser generator along said reference axis, and wherein said laser generator has a second emission frequency at which said diffractive transmission optical element transmits the whole of a laser beam emitted from said laser generator along said first line of sight.

7. The laser observation space instrument according to claim 6, wherein said first and second lines of sight have equal inclinations with respect to said reference axis.

8. The laser observation space instrument according to claim 1, wherein said first and second lines of sight have, with respect to said reference axis, inclinations between about 20° and about 80°.

9. The laser observation space instrument according to claim 8, wherein said inclinations are between about 40° and about 50°.

10. An observation space vehicle for the quantitative characterization, by DOPPLER effect, of movements within a fluid mass carried by a planet, said observation space vehicle comprising:
- a platform capable of following an orbit around said planet;
- a roll axis capable of being oriented parallel to said orbit;
- a yaw axis perpendicular to said roll axis, said yaw axis capable of being oriented toward the center of said planet; and the laser observation space instrument, in accordance with claim 1, fixed to said platform such that said reference axis of said laser observation space instrument is parallel to said roll axis.

11. A laser observation space instrument for the quantitative characterization by DOPPLER effect of movements within a fluid mass carried by a planet, said laser observation space instrument capable of being moved by a carrier vehicle along a trajectory above said fluid mass, said laser observation space instrument comprising:
- a reference axis capable of being oriented locally parallel to said trajectory;
- a panel for mounting said laser observation space instrument to said carrier vehicle;
- a laser generator mounted on said panel;
- a frequency measuring unit mounted on said panel;
- sighting means, mounted on said panel and aligned on said reference axis, having at least first and second lines of sight of non-null inclinations with respect to said reference axis, said at least first and second lines of sight capable of being oriented toward said planet for the emission and reception of laser beams, said sighting means having a diffractive optical element; and
- a telescope device having an axis collinear with said reference axis, for sending laser beams emitted by said laser generator to said sighting means and for applying laser beams received by said sighting means to said frequency measuring unit, said telescope device including a single telescope, said diffractive optical element of said sighting means being adapted to split laser beams sent by said telescope device at a predetermined frequency into at least two beams having different directions and to send to said telescope device, along said reference axis, laser beams received by said sighting means along said different directions.

12. The laser observation space instrument according to claim 11, wherein said sighting means comprises a diffractive reflecting optical element adapted to reflectively split a laser beam into different laser reflected beams.

* * * * *

UNITED STATES PATENT AND TRADEMARK OFFICE
CERTIFICATE OF CORRECTION

PATENT NO.   : 5,726,743
DATED        : March 10, 1998
INVENTOR(S)  : Rodolphe Krawczyk It is certified that error appears in the above-identified patent and that said Letters Patent is hereby corrected as shown below:

Column 1, line 11, after "form part thereof." kindly begin a new paragraph; line 26, kindly delete "known-" and insert ---- known ----.

Column 7, line 2, after "emitted/received" kindly delete "a" and insert ---- at ----; line 52, kindly delete "b&" and insert ---- be ----.

Column 8, line 22, kindly delete "panell" and insert ---- panel; ----; line 24, kindly delete "elements1" and insert ---- elements, ----; line 35, kindly delete "with its".

Signed and Sealed this

Ninth Day of March, 1999

Attest:

*Attesting Officer*

Q. TODD DICKINSON

*Acting Commissioner of Patents and Trademarks*